US008635528B2

(12) United States Patent
Byron et al.

(10) Patent No.: US 8,635,528 B2
(45) Date of Patent: Jan. 21, 2014

(54) SYSTEM AND METHOD FOR DYNAMIC SEARCH RESULT FORMATTING

(75) Inventors: Robert V. Byron, Frisco, TX (US); Terry L. Ferrell, Frisco, TX (US)

(73) Assignee: Nexplore Technologies, Inc., New York, NY (US)

( * ) Notice: Subject to any disclaimer, the term of this patent is extended or adjusted under 35 U.S.C. 154(b) by 890 days.

(21) Appl. No.: 12/323,899

(22) Filed: Nov. 26, 2008

(65) Prior Publication Data

US 2010/0115396 A1 May 6, 2010

Related U.S. Application Data

(63) Continuation-in-part of application No. 12/265,804, filed on Nov. 6, 2008.

(51) Int. Cl.
*G06F 17/00* (2006.01)

(52) U.S. Cl.
USPC ........... 715/255; 707/706; 707/707; 704/235; 715/205; 715/784; 715/764; 715/234; 715/235

(58) Field of Classification Search
USPC .................................. 715/255; 707/706, 707
See application file for complete search history.

(56) References Cited

U.S. PATENT DOCUMENTS

| | | | |
|---|---|---|---|
| 6,271,840 B1 | 8/2001 | Finseth et al. | |
| 6,353,448 B1 * | 3/2002 | Scarborough et al. | ........ 715/744 |
| 6,438,539 B1 | 8/2002 | Korolev et al. | |
| 7,136,882 B2 | 11/2006 | Collins et al. | |
| 7,380,212 B2 | 5/2008 | Cody et al. | |
| 7,610,219 B2 | 10/2009 | Sayed | |
| 7,769,895 B1 | 8/2010 | Williams et al. | |
| 2002/0046232 A1 | 4/2002 | Adams et al. | |
| 2003/0030679 A1 | 2/2003 | Jain | |
| 2003/0146939 A1 * | 8/2003 | Petropoulos et al. | ......... 345/810 |
| 2004/0049541 A1 | 3/2004 | Swahn | |
| 2004/0189699 A1 | 9/2004 | Dobronsky | |
| 2005/0114784 A1 * | 5/2005 | Spring et al. | .................. 715/762 |
| 2005/0283468 A1 | 12/2005 | Kamvar et al. | |
| 2006/0224582 A1 | 10/2006 | Hogue | |
| 2006/0224587 A1 | 10/2006 | Zamir et al. | |

(Continued)

FOREIGN PATENT DOCUMENTS

WO 2005091175 A1 9/2005

OTHER PUBLICATIONS

Globefeed floating preview tool, available as of Jan. 2, 2007 at http://www.globefeed.com/flinkpreview.html.*

(Continued)

*Primary Examiner* — William Bashore
*Assistant Examiner* — Nathan Shrewsbury
(74) *Attorney, Agent, or Firm* — Mark W Handley

(57) ABSTRACT

An online search result formatting system and method. The system receives the results of an online search conducted by a user. A view assignment module selects a view template from a plurality of predefined view templates. A content templating module formats the results per the chosen template. An image request system obtains an image representing each search result from the image generation, delivery, and management system. A content population module prepares the content with the results and images in accordance with the selected view template for ultimate display in the user's graphical user interface. The user may select from among the plurality of predefined view templates to alter the display accordingly.

18 Claims, 5 Drawing Sheets

(56) References Cited

U.S. PATENT DOCUMENTS

Figure 1:
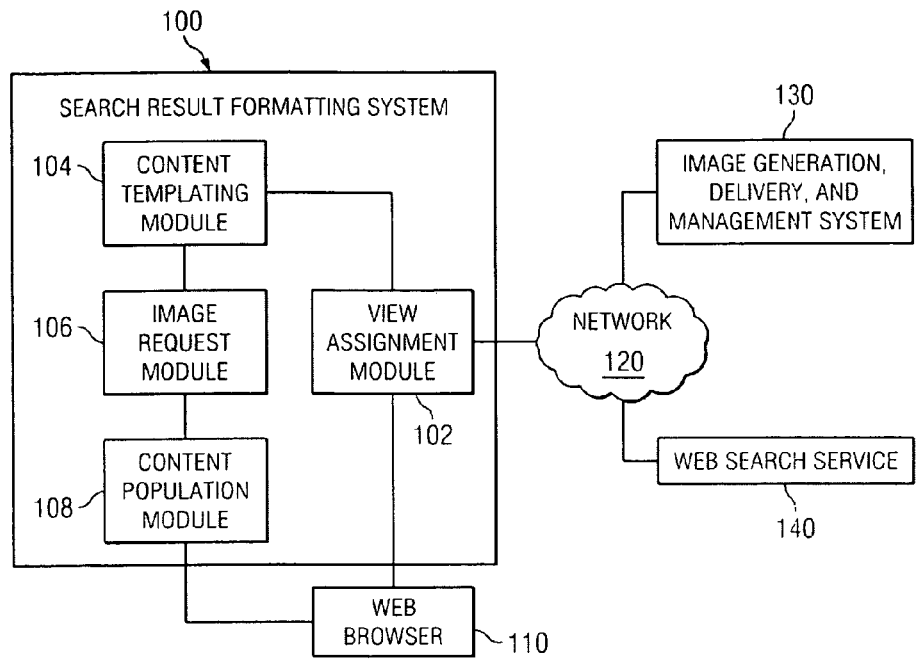

| | | |
|---|---|---|
| 2006/0265417 A1 | 11/2006 | Amato et al. |
| 2007/0174790 A1* | 7/2007 | Jing et al. ............. 715/838 |
| 2007/0239716 A1 | 10/2007 | Weininger et al. |
| 2007/0244866 A1 | 10/2007 | Mishkanian et al. |
| 2007/0255755 A1 | 11/2007 | Zhang et al. |
| 2008/0140637 A1 | 6/2008 | Kumar |
| 2008/0140712 A1 | 6/2008 | Weber et al. |
| 2008/0140806 A1 | 6/2008 | Kumar |
| 2008/0201326 A1 | 8/2008 | Cotter et al. |
| 2009/0012940 A1 | 1/2009 | Ives et al. |
| 2009/0100362 A1* | 4/2009 | Sauve et al. ............. 715/765 |
| 2009/0307603 A1* | 12/2009 | Gowda et al. ............. 715/749 |
| 2009/0327101 A1 | 12/2009 | Sayed |

OTHER PUBLICATIONS

Globefeed floating preview tool, available as of Jan. 2, 2007 at http://www.globefeed.com/flinkpreview.html (Archive.org).*

Wu, et al.; "Harvesting Social Knowledge from Folksonomies"; HT; Aug. 22-25, 2006, Odense, Denmark; pp. 111-114.

Support—websnapr—Website Snapshots; http://www.websnapr.com/support/; Websnapr; (at least as early as Nov. 25, 2008); 2 pp.

http://www.websnapr.com/support/; "websnapr 2.0"; Service by construktiv and trafficmaxx; At least as early as Nov. 25, 2008; 2 pp.

* cited by examiner ered to be within the skills of persons of ordinary skill in the relevant art.

SYSTEM AND METHOD FOR DYNAMIC SEARCH RESULT FORMATTING

CROSS-REFERENCE TO RELATED APPLICATIONS

This application is a continuation-in-part of U.S. patent application Ser. No. 12/265,804, which was filed on Nov. 6, 2008.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates to web search services, and more specifically to dynamic search result formatting systems.

2. Description of Related Art Including Information Disclosed Under 37 CFR 1.97 and 1.98

Traditional search engines format search results to render them to a user. This search result rendering is typically static and non-customizable, thereby limiting a user's online experience. The present invention achieves technical advantages by utilizing interactive icons to allow a user to select how search results are displayed, according to a view template, thereby providing the user a custom search experience. The view selected changes the text format along with the web-browser focus of viewing the website images vs the text on the site, and dynamically generates HTML image tags where the attributes of the image tag are determined by the view. The source attribute of the image tag is dynamically populated with an image request URL customized by the view template.

BRIEF SUMMARY OF THE INVENTION

The present invention provides a method, system, and computer software for dynamically formatting search results in a networked environment. A networked application accesses a computing device that performs the novel method steps.

The system accepts results of a network search performed by a user. A view template is then selected by the system, from a plurality of pre-defined view templates. An image tag is then generated for each search result, with the tag containing certain attributes as required by the selected view template. The system then generates an image request URL, for each search result, with the request based upon the view template requirements and receives an image for each request. The results and received images are then formatted in accordance with the view template and the content is generated for display in the user's graphical user interface (GUI).

The system also provides additional functionality. When the user performs a mouse-over of a given result, a pop-up image presents a preview of the particular result's link. Further, the user has the option of selecting a different view, such as the summary view, gallery view, and line view, in order to change the display format.

BRIEF DESCRIPTION OF THE SEVERAL VIEWS OF THE DRAWING(S)

Figure 3:
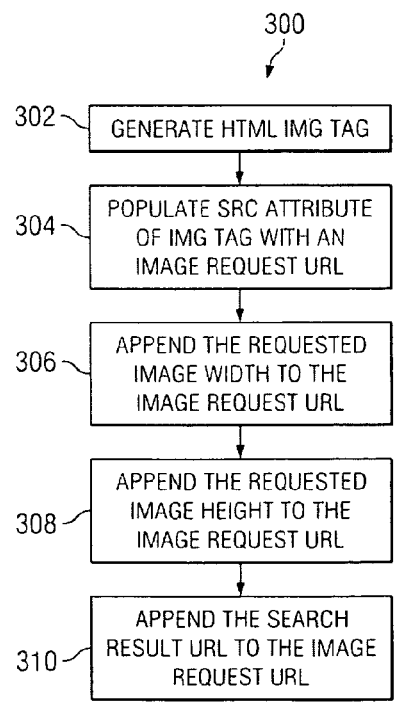
Figure 2:
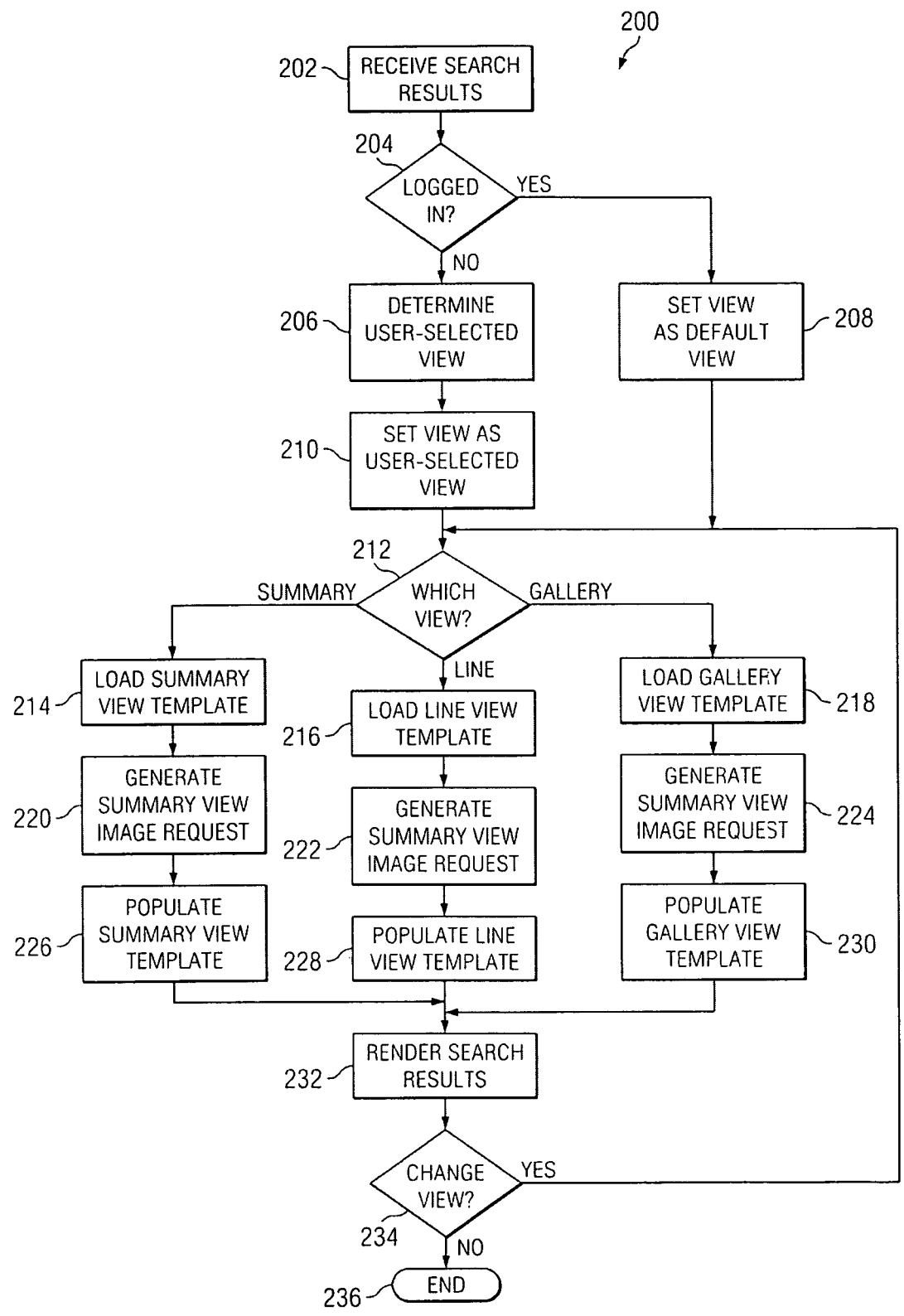
Figure 4:
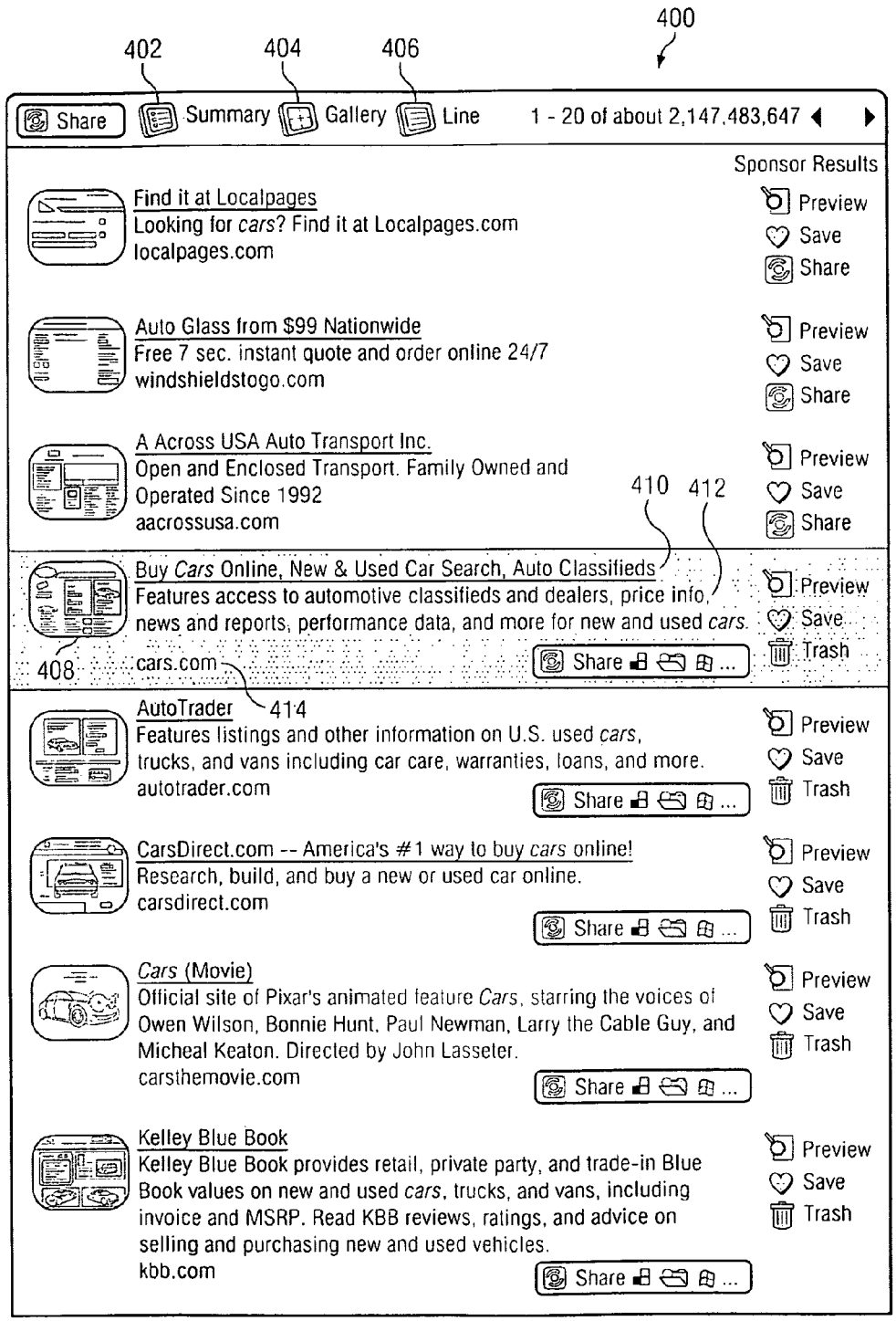
Figure 5:
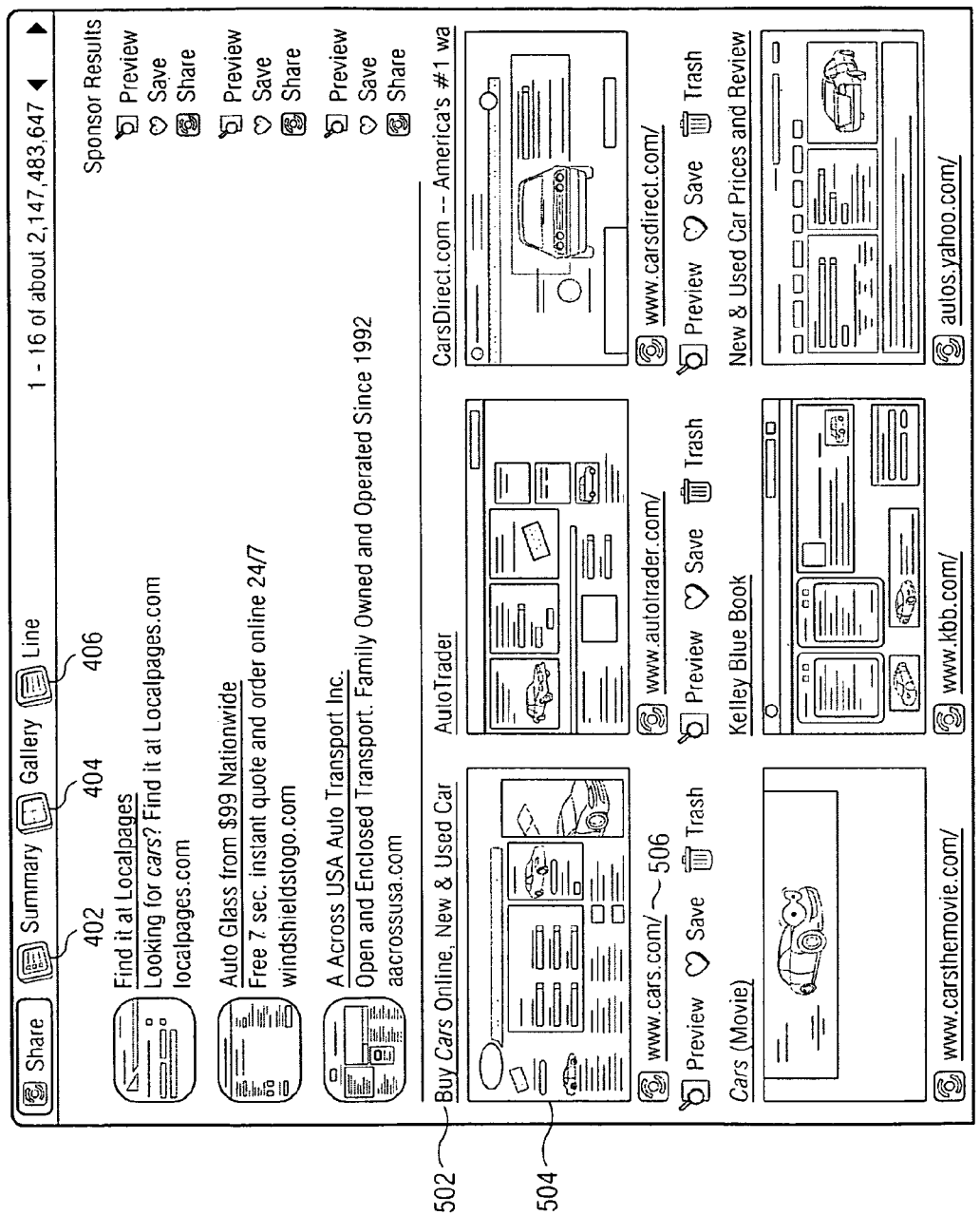
Figure 6:
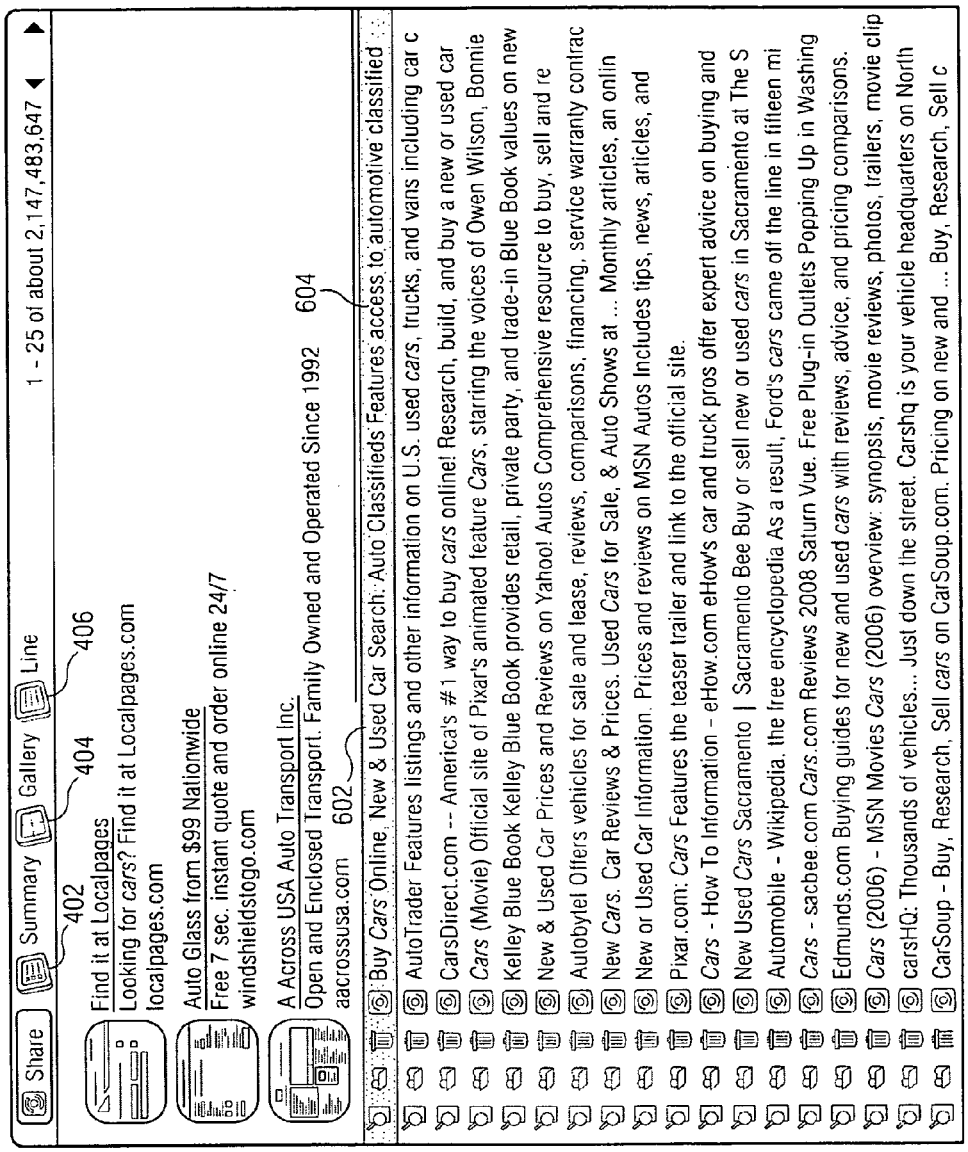
Figure 6:
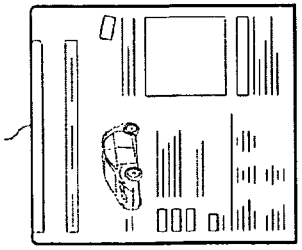

The present invention will be more fully understood by reference to the following detailed description of the preferred embodiments of the present invention when read in conjunction with the accompanying drawings, wherein:

FIG. 1 exemplifies a diagram of a dynamic search result formatting system in a networked environment, in accordance with principles of the present invention;

FIG. 2 exemplifies a diagram of a method for dynamically formatting search results, in accordance with principles of the present invention;

FIG. 3 exemplifies a diagram of a method for requesting images, in accordance with principles of the present invention;

FIG. 4 contains a screen shot of search results rendered in a summary view, in accordance with principles of the present invention;

FIG. 5 contains a screen shot of search results rendered in a gallery view, in accordance with principles of the present invention; and FIG. 6 contains a screen shot of search results rendered in a line view, in accordance with principles of the present invention.

The above figures are provided for the purpose of illustration and description only, and are not intended to define the limits of the disclosed invention. Use of the same reference number in multiple figures is intended to designate the same or similar parts. Furthermore, if and when the terms "top," "bottom," "first," "second," "upper," "lower," "height," "width," "length," "end," "side," "horizontal"; "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

In the following discussion, numerous specific details are set forth to provide a thorough understanding of the present invention. However, it will be obvious to those skilled in the art that the present invention may be practiced without such specific details. In other instances, well-known elements have been illustrated in schematic or block diagram form in order not to obscure the present invention in unnecessary detail. Additionally, for the most part, details concerning the Internet, digital content, and the like have been omitted inasmuch as such details are not considered necessary to obtain a complete understanding of the present invention, and are considered to be within the skills of persons of ordinary skill in the relevant art.

Referring to FIG. 1, there is shown a diagram of a dynamic search result formatting system (100) for dynamically formatting search results and content received over a network, in accordance with principles of the present invention. The system (100) is part of an application adapted to provide search results associated with a search term. The system (100) is preferably implemented in hardware, software, or a suitable combination of hardware and software thereof and may comprise one or more software systems operating on a digital signal processing platform or other suitable processing platforms.

As used herein, "hardware" can include a combination of discrete components, an integrated circuit, a microprocessor, a controller, a microcontroller, an application-specific integrated circuit (ASIC), an electronic data processor, a computer, a field programmable gate array, or other suitable hardware connectable for interfacing with a network, such as the Internet, considered to be well-known in the art.

As used herein, "software" can include one or more objects, agents, threads, lines of code, subroutines, separate software applications, two or more lines of code or other suitable software structures operating in two or more software applications or on two or more processors, or other suitable hardware structures. Furthermore, it is considered that the design, development, and implementation details of all such hardware and software would be apparent to a person having ordinary skill in the art based upon a review of the present description of the invention. In one embodiment, software can include one or more lines of code or other suitable software structures operating in a general purpose software application, such as an operating system, and one or more lines of code or other suitable software structures operating in a specific purpose software application.

The system (100) is operably coupled to web-browser (110), image generation, delivery, and management system (130) and a web search service (140) by network (120). The network can be a WAN, MAN, LAN, PAN, or other suitable network configuration. The system (100) is adapted to receive a plurality of search results from web search service (140) via network (120).

The system (100) instantiates one of a plurality of predefined templates, generates customized image requests, and populates one of a plurality of predefined templates. The application can be resident on a computer, a website, blog, forum, aggregator, or other suitable web-enabled application. The system (100) in this embodiment also includes a view assignment module (102), a content templating module (104), an image request module (106), and a content population module (108).

The view assignment module (102) is adapted to set a view for rendering content associated with the search term in the web-browser (110). In one embodiment, content can be digital images, text, music, video, and other suitable digital content. The view assignment module (102) can be achieved with an application programming interface (API), a network connection, a network transfer protocol, HTML, DHTML, JavaScript, Dojo, Ruby, Rails, other suitable applications, or a suitable combination thereof.

The view assignment module (102) sets the view by assigning a value associated with one of the views to a view variable. The view assignment module (102) determines which view value to assign to the view variable according to a predetermined default view value or a user-defined view value. The default view value is assigned to the view variable unless a user selects a different view. At that point, the user-defined view value associated with the user-selected view is assigned to the view variable. In a second embodiment, the user can select an icon associated with a view, shown in the web-browser (110), to assign the user-defined view value to the view variable. In a third embodiment, the user can create an account associated with the application, and select the view to associate with the account in account settings. When the user logs into the application, the user-defined view value associated with the account is assigned to the view variable. The user can select the icon associated with another view in the web-browser (110) to change the view, even when logged in.

The content templating module (104) is adapted to format content according to a predetermined template for rendering in the web-browser (110). Each view has a predefined template that determines location, orientation, size, length, color, and other suitable parameters. In one embodiment, one of a plurality of predefined templates is applied to the content according to the view value of the view variable. The content templating module (104) can be achieved with an application programming interface (API), a network connection, a network transfer protocol, HTML, DHTML, JavaScript, Dojo, Ruby, Rails, other suitable applications, or a suitable combination thereof.

The content templating module (104) applies a template to content to present at least three views to the user: a summary view, a line view, and a gallery view. The summary view presents an image, having a first size determined by the summary view template, of a webpage associated with the URL of a search result next to the title of the search result webpage, the first two lines of text of the search result webpage, and the search result URL. Each search result is highlighted, as it is moused-over. In one embodiment, the image is generated by the image generation, delivery, and management system (130).

The line view presents a single line of text for each search result. The line of text includes the title of the search result webpage and the first line of text of the search result webpage. On mouse-over, each search result is highlighted and an image, having a second size determined by the line view template, is displayed. In one embodiment, the image is generated by the image generation, delivery, and management system (130).

The gallery view presents an image, having a third size determined by the gallery view template, of a webpage associated with the URL of a search result under the title of the search result webpage, and over the search result URL. In one embodiment, the image is generated by the image generation, delivery, and management system (130).

The image request module (106) generates an image request URL for retrieving the image associated with the URL of a search result. Once the system (100) receives search results from the web search service (140), the content templating module (104) generates a template-customized HTML image tag (IMG) and inserts it into the template in the appropriate location. The IMG contains the height and width attributes of the image size appropriate for the view. The source attribute (SRC) of the IMG tag is populated with a base image request URL, pointing to the image generation, delivery, and management system (130). The image request module (106) generates a full image request URL by appending a requested width, taken from the width attribute, and a requested height, taken from the height attribute, and the search result URL to the base image request URL. The image request module (106) can be achieved with an application programming interface (API), a network connection, a network transfer protocol. HTML, DHTML, JavaScript, Dojo, Ruby, Rails, other suitable applications, or a suitable combination thereof.

The content population module (108) generates the code required to display each search result and image associated with the URL of each search result. The content population module (108) loops through each search result to be displayed to populate the template with the content specific to each search result. Each search result is processed and parsed. The title, meta-data, and text is formatted according to the template and inserted into the appropriate locations for each view by the content population module (108). The template-customized content rendering is left to the web-browser (110). The content population module (104) can be achieved with an application programming interface (API), a network connection, a network transfer protocol, HTML, DHTML, JavaScript, Dojo, Ruby, Rails, other suitable applications, or a suitable combination thereof.

Referring now to FIG. 2, there is shown a flow chart (200) exemplifying control logic embodying features of a method for dynamically formatting search results in accordance with principles of the present invention. The search result formatting control logic (200) can be implemented as an algorithm on a general purpose computing platform or other suitable microprocessor-based system.

The search result formatting control logic (200) can leverage the ability of a computer platform to spawn multiple processes and threads by processing data simultaneously. The speed and efficiency of the search result formatting control logic (200) is greatly improved by instantiating more than one process to format images and text associated with a search result. However, one skilled in the art of programming will appreciate that use of a single processing thread may also be utilized and is within the scope of the present invention.

The search result formatting control logic (200) process flow of the present embodiment begins at step 202, where search results are received from web search service (140). The logic then proceeds to 204.

At step 204, it is determined whether the user is logged into the application. If the user is logged in, the logic proceeds to step 208. If the user is not logged in, the logic proceeds to step 206.

At step 208, the view variable is set to the default view value. In one embodiment, the default view is the summary view, which has a value of 'SUM'. In a second embodiment, the default view is the line view, which has a value of 'LIN'. In a third embodiment, the default view is the gallery view, which has a value of 'GAL'. The logic then proceeds to 212.

At step 206, the method determines which user-selected view is to be used to display content associated with the search results. In one embodiment, the user selected one of a plurality of views to display content associated with the search results. The logic then proceeds to 210.

At step 210, the view variable is set to the user-selected view value. In one embodiment, the user-selected view is the summary view, which has a value of 'SUM'. In a second embodiment, the user-selected view is the line view, which has a value of 'LIN'. In a third embodiment, the user-selected view is the gallery view, which has a value of 'GAL'. The logic then proceeds to 212.

At step 212, it is determined whether the view to be displayed in the web-browser (110) is the summary view, the line view, or the gallery view. If the view to be displayed is the summary view, the logic proceeds to step 214. If the view to be displayed is the line view, the logic proceeds to step 216. If the view to be displayed is the gallery view, the logic proceeds to step 218.

At step 214, a summary view template is loaded. In one embodiment, the summary view template includes a first image, having a first size determined by the summary view template, of a webpage associated with the URL of a search result, the title of the search result webpage, two lines of text from the search result webpage, and the URL of the search result webpage. The search result is highlighted as the user mouses-over the search result. The logic then proceeds to 220.

At step 220, a summary view image request URL is generated. In one embodiment, the source attribute (SRC) of the IMG tag is populated with a base image request URL pointing to the image generation, delivery, and management system (130). The image request module (106) generates a full image request URL by appending a requested width, taken from the width attribute, and a requested height, taken from the height attribute, and the search result URL to the base image request URL. In a second embodiment, ampersands are inserted between items appended to the base URL. In a third embodiment, the full URL is similar to: http://img.nexplore.com/image_retrieve?w=140&h=175&url=http%3A%2F%2Fwww.nexplore.com%2Fsearch.html%2F. The logic then proceeds to 226.

At step 226, the summary view template is populated with content associated with the search results. In one embodiment, the summary view template computer code loops through each search result to be displayed to populate the summary view template with the content specific to each search result. Each search result is processed and parsed. In a second exemplary embodiment, the title, meta-data, and text of a search result is formatted according to the summary view template and inserted into the appropriate location. The logic then proceeds to 232.

At step 216, a line view template is loaded. In one embodiment, the line view template includes a single line of text for each search result containing: the title of the search result webpage and the first line of text of the search result webpage. On mouse-over, each search result is highlighted and a second image, having a second size determined by the line view template, is displayed in a pop-up window. The logic then proceeds to 222.

At step 222, a line view image request URL is generated. In one embodiment, the source attribute (SRC) of the IMG tag is populated with a base image request URL, pointing to the image generation, delivery, and management system (130). The image request module (106) generates a full image request URL by appending a requested width, taken from the width attribute, and a requested height, taken from the height attribute, and the search result URL to the base image request URL. In a second embodiment, an ampersand, is inserted between items appended to the base URL. In a third embodiment, the full URL is similar to: http://img.nexplore.com/image_retrieve?w=140&h=175&url=http%3A%2F%2Fwww.nexplore.com%2Fsearch.html%2F. The logic then proceeds to 228.

At step 228, the line view template is populated with content associated with the search results. In one embodiment, the line view template computer code loops through each search result to be displayed to populate the line view template with the content specific to each search result. Each search result is processed and parsed. In a second exemplary embodiment, the title, meta-data, and text of a search result is formatted according to the line view template and inserted into the appropriate location. The logic then proceeds to 232.

At step 218, a gallery view template is loaded. In one embodiment, the gallery view template includes an image, having a third size determined by the gallery view template, of a webpage associated with the URL of a search result under the title of the search result webpage, and over the search result URL. The logic then proceeds to 224.

At step 224, a gallery view image request URL is generated. In one embodiment, the source attribute (SRC) of the IMG tag is populated with a base image request URL, pointing to the image generation, delivery, and management system (130). The image request module (106) generates a full image request URL by appending a requested width, taken from the width attribute, and a requested height, taken from the height attribute, and the search result URL to the base image request URL. In a second embodiment, an ampersand is inserted between items appended to the base URL. In a third embodiment, the full URL is similar to: http://img.nexplore.com/image_retrieve?w=140&h=175&url=http%3A%2F%2Fwww.nexplore.com%2Fsearch.html%2F. The logic then proceeds to 230.

At step 230, the gallery view template is populated with content associated with the search results. In one embodiment, the gallery view template computer code loops through each search result to be displayed to populate the gallery view template with the content specific to each search result. Each search result is processed and parsed. In a second exemplary embodiment, the title, meta-data, and text of a search result is formatted according to the gallery view template and inserted into the appropriate location. The logic then proceeds to 232.

At step 232, the search results are rendered in a web-browser. The logic then proceeds to 234.

At step 234, it is determined whether the user has changed the view. In one embodiment, the user can select the icon associated with another view in the web-browser (110) to change the view, even when logged in. If the view is changed, the logic proceeds to step 212. If the view is not changed, the logic proceeds to step 236.

At step 236, the method is terminated.

Referring now to FIG. 3, there is shown a flow chart (300) exemplifying control logic embodying features of a method for requesting images, in accordance with principles of the present invention. The image request control logic (300) can be implemented as an algorithm on a general purpose computing platform or other suitable microprocessor-based system.

The image request control logic (300) process flow of the present embodiment begins at step 302, where an HTML IMG is generated. In one embodiment, the IMG is determined by the view. The logic then proceeds to step 304.

At step 304, the source attribute (SRC) of the IMG tag is populated with a base image request URL, pointing to the image generation, delivery, and management system (130). The logic then proceeds to step 306.

At step 306, the base image request URL is appended with a requested image width, taken from the width attribute. In one embodiment, the requested image width is determined by the view. Each view can have a different image width. The logic then proceeds to step 308.

At step 308, the base image request URL is appended with a requested image height, taken from the height attribute. In one embodiment, the requested image height is determined by the view. Each view can have a different image width. The logic then proceeds to step 310.

At step 310, the base image request URL is appended with the search result URL. In one embodiment, a full URL is similar to: http://img.nexplore.com/image$_{retrieve?w=}$140&h=175&url=http%3A%2F%2Fwww.nexplore.com%2Fsearch.html%2F.

Referring now to FIG. 4, there is shown at 400 a screen shot of a web-browser rendering search results in a summary view, in accordance with principles of the present invention. The summary view includes a first image (408), having a first size determined by the summary view template, of a webpage associated with the URL of a search result, the title (410) of the search result webpage, two lines of text (412) from the search result webpage, and the URL, (414) of the search result webpage. The search result is highlighted as the user mouses-over the search result.

Referring now to FIG. 5, there is shown at 500 a screen shot of a web-browser rendering search results in a gallery view, in accordance with principles of the present invention. The gallery view includes a third image (504), having a third size determined by the gallery view template, of a webpage associated with the URL of a search result under the title (502) of the search result webpage and over the search result URL (506).

Referring now to FIG. 6, there is shown at 600 a screen shot of a web-browser rendering search results in a line view, in accordance with principles of the present invention. The line view includes a single line of text for each search result, containing: the title (602) of the webpage associated with the search result and the first line of text (604) of the search result webpage. The webpage title (602) is displayed in one color and font, while the first line of text (604) is displayed in a second color and font. On mouse-over, each search result is highlighted and a second image (606), having a second size determined by the line view template, is displayed in a pop-up window. In one embodiment, a search result is highlighted and a second image (606), having a second size determined by the line view template, is displayed in a pop-up window, on mouse-over of an area of the web-browser containing the search result.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

We claim:

1. A method for dynamically rendering search results in a networked environment, the search results providing content for display in an application having a graphical user interface (GUI), the method steps comprising:

accepting search results of a network search performed by a user, wherein each said search result comprises a search result uniform resource locator (URL) and text;

selecting a view template from a plurality of predefined view templates by assigning a value associated with the view template to a view variable of the application having the GUI, and wherein the assigned value determines the format of the content for display in the application;

generating an image tag that corresponds to the selected view template for each said search result by populating source attributes that define said format of the selected view template with a base image request URL;

generating an image request URL for each said search result by appending values that correspond to said attributes to said base image request URL;

retrieving an image based on said image request URL, wherein the image is manipulated to adapt to said source attributes of the selected view template;

rendering the content of said search results for display in the user's GUI based upon the selected view template, the retrieved image, and the search result text; and rendering a plurality of icons in proximity of each of said search results for the user to manipulate and customize the corresponding search results, wherein the plurality of icons include at least a delete icon for deleting the search result from the GUI, a save icon for saving the search result to a data storage device, a share icon for sharing the search result with other users, and a preview icon to preview at least part of contents associated with the search result.

2. The method of claim 1, the method steps further comprising:
providing a code necessary to display the content in the user's GUI.

3. The method of claim 2, the method steps further comprising:
providing the code necessary to display a pop-up image of the Web page associated with a particular result link when the user performs a mouse-over on an area containing the particular result link.

4. The method of claim 1, the method steps further comprising:
providing user selectable links in the GUI to allow the user to choose a particular view template.

5. The method of claim 1, wherein the predefined view templates comprise a summary view, a line view, and a gallery view.

6. The method of claim 1, wherein the image tag comprises at least one image attribute.

7. A computer software program in a non-transitory computer readable medium, the program including machine-readable instructions executable by a computer processor to perform a method for dynamically rendering search results in a networked environment, the search results providing content for display in an application having a graphical user interface (GUI), the program steps comprising:
accepting search results of a network search performed by a user, wherein each said search result comprises a search result uniform resource locator (URL);
selecting a view template front a plurality of predefined view templates by assigning a value associated with the view template to a view variable of the application having the GUI, and wherein the assigned value determines the format of the content for display in the application;
generating an image tag that corresponds to the selected view template for each said search result by populating source attributes that define said format of the selected view template with a base image request URL;
generating an image request URL for each said search result by appending values that correspond to said attributes to said base image request URL;
retrieving an image based on said image request URL, wherein the image is manipulated to adapt to said source attributes of the selected view template;
rendering the content of said search results for display in the user's GUI based upon the selected view template, the retrieved image, and the search result text; and
rendering a plurality of icons in proximity of each of said search results for the user to manipulate and customize the corresponding search results, wherein the plurality of icons include at least a delete icon for deleting the search result from the GUI a save icon for saving the search result to a data storage device, a share icon for sharing the search result with other users, and a preview icon to review at least of contents associated with the search result.

8. The computer software program of claim 7, the program steps further comprising:
providing a code necessary to display the content in the user's GUI.

9. The computer software program of claim 8, the program steps further comprising:
providing the code necessary to display a pop-up image of the Web page associated with a particular result link when the user performs a mouse-over on the particular result link.

10. The computer software program of claim 7, the program steps further comprising:
providing user selectable links in the GUI to allow the user to choose a particular view template.

11. The computer software program of claim 7, wherein the predefined view templates comprise a summary view, a line view, and a gallery view.

12. The computer software program of claim 7, wherein the image tag comprises at least one image attribute.

13. An automated system for dynamically rendering search results in a networked environment, the search results providing content for display in an application having a graphical user interface (GUI), the system comprising:
a networked computer processor device capable of executing machine-readable instructions to perform the program steps comprising:
accepting search results of a network search performed by a user, wherein each said search result comprises a search result uniform resource locator (URL);
selecting a view template from a plurality of predefined view templates by assigning a value associated with the view template to a view variable of the application having the GUI, and wherein the assigned value determines the format of the content for display in the application;
generating an image tag that corresponds to the selected view template for each said search result by populating source attributes that define said format of the selected view template with a base image request URL;
generating an image request URL for each said search result by appending values that correspond to said attributes to said base image request URL;
retrieving an image based on said image request URL, wherein the image is manipulated to adapt to said source attributes of the selected view template;
rendering the content of said search results for display in the user's GUI based upon the selected view template, the retrieved image, and the search result text; and
rendering a plurality of icons in proximity of each of said search results for the user to manipulate and customize the corresponding search results wherein the plurality of icons include at least a delete icon for deleting the search result from the GUI, a save icon for saving the search result to a data storage device, a share icon for sharing the search result with other users, and a preview icon to preview at least part of contents associated with the search result.

14. The system of claim 13, the program steps further comprising:
providing a code necessary to display the content in the user's GUI.

15. The system of claim 14, the program steps further comprising:
providing the code necessary to display a pop-up image of the Web page associated with a particular result link when the user performs a mouse-over on the particular result link.

16. The system program of claim 13, the program steps further comprising:
providing user selectable links in the GUI to allow the user to choose a particular view template.

17. The system of claim 13, wherein the predefined view templates comprise a summary view, a line view, and a gallery view.

18. The system of claim 13, wherein the image tag comprises at least one image attribute.

\* \* \* \* \*